United States Patent

[11] 3,561,768

[72] Inventor John F. Castagna
Brooklyn, N.Y.
[21] Appl. No. 819,834
[22] Filed Apr. 28, 1969
[45] Patented Feb. 9, 1971
[73] Assignee Castagna Electronics Corporation
Brooklyn, N.Y.
a corporation of Delaware

---

[54] PHONOGRAPH
13 Claims, 15 Drawing Figs.

[52] U.S. Cl. .......... 274/9
[51] Int. Cl. .......... G11b 3/00, G11b 25/04
[50] Field of Search .......... 274/9, 9.1, 9.2

[56] References Cited
UNITED STATES PATENTS

| | | | |
|---|---|---|---|
| 2,943,861 | 7/1960 | Redfield .......... | 274/9 |
| 3,165,320 | 1/1965 | Ryan .......... | 274/2 |
| 3,193,295 | 7/1965 | Isemura .......... | 274/9 |
| 3,446,505 | 5/1969 | Tiraboschi .......... | 274/1 |

*Primary Examiner*—Leonard Forman
*Assistant Examiner*—A. J. Mirabito
*Attorney*—Ostrolenk, Faber, Gerb & Soffen

---

ABSTRACT: A phonograph for playing thin flexible vinyl disk-records is provided with means for automatically lifting the record from the turntable so that it may be readily grasped for manual removal. Cooperating with the record-lifting means is a spindle for centering the record on the turntable and a flange associated with the spindle for clamping the record against the turntable during rotation of the latter. The centering spindle and clamping means are mounted to a hinged platform which also carries the tone arm. When the hinged platform is raised, the tone arm is operated to a position where the stylus is aligned with the record lead-in groove and upon subsequent lowering of the hinged platform a switch is automatically operated to energize the electrical circuits for rotating the turntable and operating the amplifier. When the stylus is in the record lead-out groove, an extension of the tone arm operates a switch to deenergize the motor and amplifier.

INVENTOR.
JOHN F. CASTAGNA

BY

OSTROLENK, FABER, GERB & SOFFEN
ATTORNEYS

INVENTOR.
JOHN F. CASTAGNA

BY

OSTROLENK, FABER, GERB & SOFFEN
ATTORNEYS

INVENTOR.
JOHN F. CASTAGNA

BY
OSTROLENK, FABER, GERB & SOFFEN
ATTORNEYS

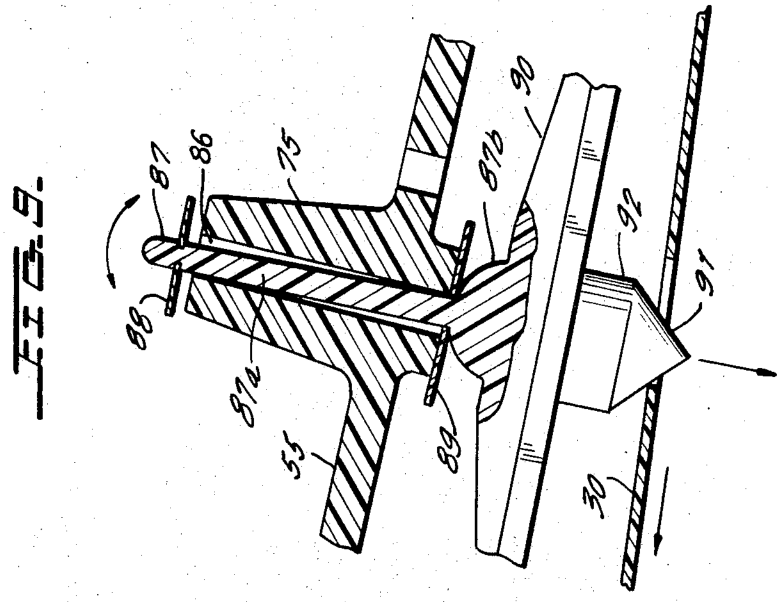
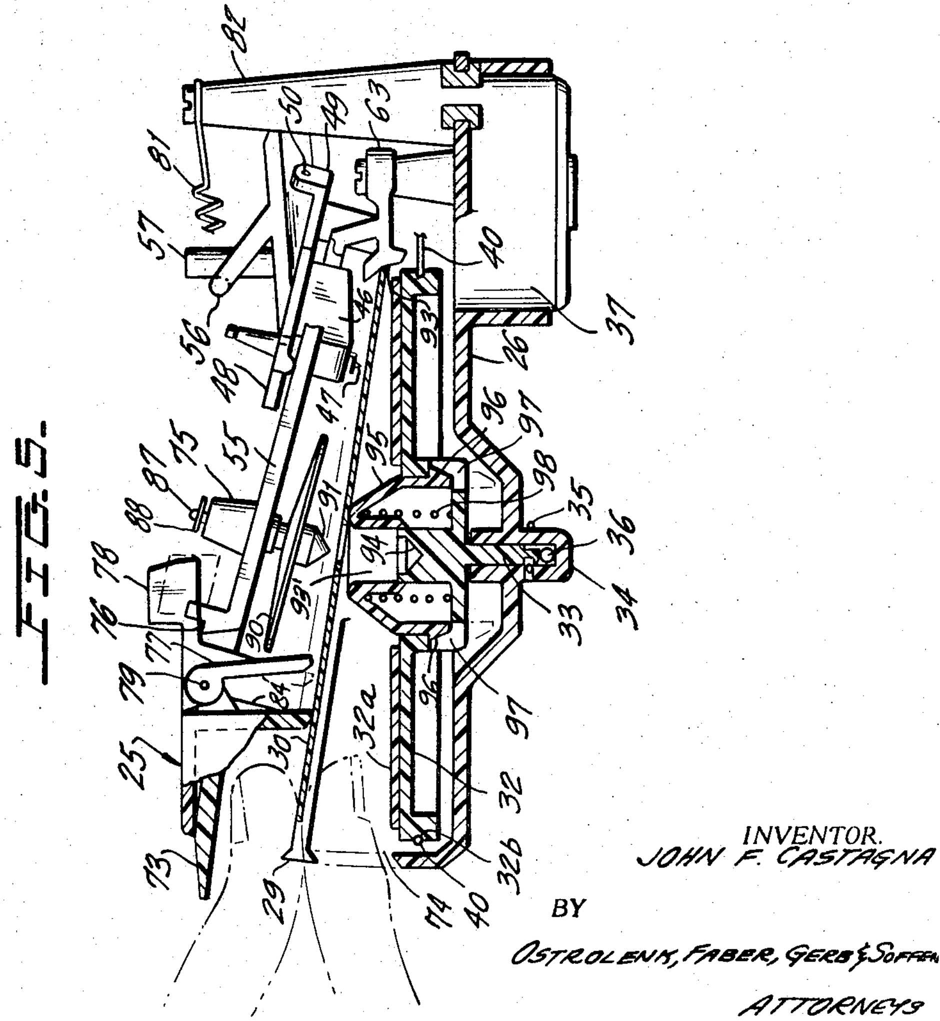
INVENTOR.
JOHN F. CASTAGNA
BY
OSTROLENK, FABER, GERB & SOFFEN
ATTORNEYS

INVENTOR.
JOHN F. CASTAGNA
BY
OSTROLENK, FABER, GERB & SOFFEN
ATTORNEYS

INVENTOR.
JOHN F. CASTAGNA

BY

OSTROLENK, FABER, GERB & SOFFEN

ATTORNEYS

INVENTOR.
JOHN F. CASTAGNA

BY

OSTROLENK, FABER, GERB & SOFFEN
ATTORNEYS

PHONOGRAPH

This invention relates to phonographs in general, and more particularly relates to a phonograph specifically adapted to play miniature disc records constructed of relatively thin flexible vinyl.

For the most part, a disc phonograph record of the prior art was manufactured by a relatively expensive process in which a heated soft "cookie" was press-molded. Records produced by this process were relatively stiff and relatively thick, being in the order of .030—.080 of an inch.

Relatively recently it has become feasible to produce low cost disc phonograph records by embossing record grooves on a heavy plastic film or plastic to paper laminate. Records produced by this embossing process have usually been of small diameter (approximately 4″), have been relatively thin (approximately .010″), and are capable of withstanding considerable bending without damage to the grooves. Since the embossed flexible records are relatively inexpensive to produce, they are ideally suited for use by children, as premiums, as give-aways, as throw-aways, and as advertising devices.

To effectively utilize these small diameter thin flexible embossed records, playback thereof should be done with relatively low-cost mechanisms that are preferably portable. These mechanisms should also be ultra-compact for convenience as well as for use as parts of toys. The playback mechanism should be constructed so that a record may be simply pushed or dropped through a slot in the mechanism housing, with the mechanism being capable of playing the record and turning itself off automatically without the user being required to manipulate the tone arm. Preferably, the mechanism should be constructed so that it may be carried or shaken or played in any position and provide satisfactory sound reproduction. In addition, the records should be easily removable.

While some of these features have been obtained by prior art mechanisms adapted for playback of relatively thick rigid records, such operational features are much more difficult to achieve when utilizing thin flexible records. More particularly, thin flexible records are too "soft" to aid in the cocking of springs and the operation of levers and other elements of automatic mechanisms. Since the record in question is "soft," such record must be supported over substantially its entire area by the turntable in order to avoid deflection under pressure exerted through the stylus. The absence of an overhanging record edge makes it difficult to readily remove a thin record from the turntable whether mechanically or manually. Further, the recording grooves on a 4″ record are so limited that in order to make a recording of standard length, the "lead-in" and "lead-out" grooves are relatively narrow, thereby requiring a relatively accurate mechanism to land the stylus in the lead-in groove and automatically turn off the turntable motor when the stylus reaches the lead-out groove.

Accordingly, a primary object of the instant invention is to provide a novel construction for a phonograph.

Another object is to provide a phonograph specifically adapted to play very thin flexible records.

Still another object is to provide a phonograph having novel means for automatically positioning a record to facilitate removal thereof from the turntable.

A further object is to provide a phonograph with a novel mechanism for centering and clamping a record on the turntable.

A still further object is to provide a novel construction for a phonograph in which the record is loaded by inserting same in a slot and the stylus is automatically placed in the lead-in groove of the record.

These objects as well as other objects of this invention will become readily apparent after reading the following description of the accompanying drawings in which:

FIGS. 5 and 6 are each cross sections taken through line 5–5 of FIG. 3. In FIG. 5, the mechanism elements are positioned for insertion of a record, while in FIG. 6 the mechanism elements are in position for playing a record.

Figure 3:
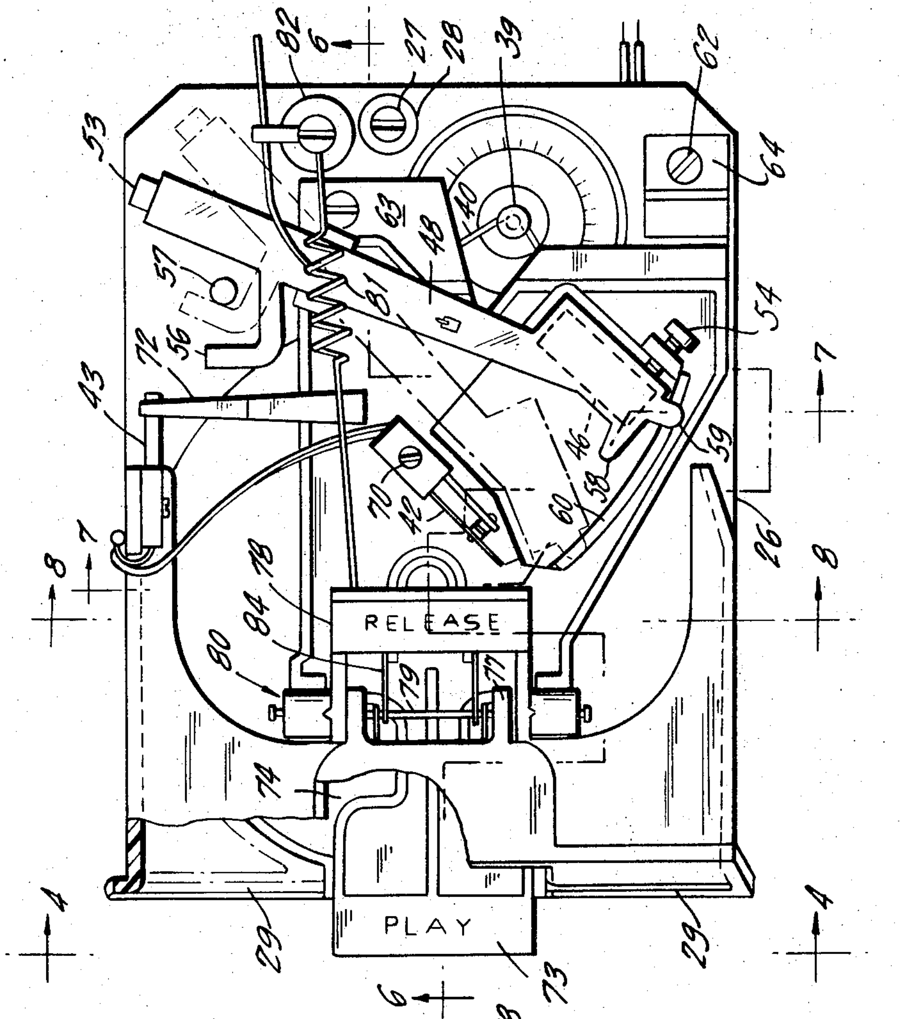
FIG. 3 is a plan view of the turntable, tone arm, and other record playback and handling elements of the mechanism shown in FIG. 2.
Figure 4:
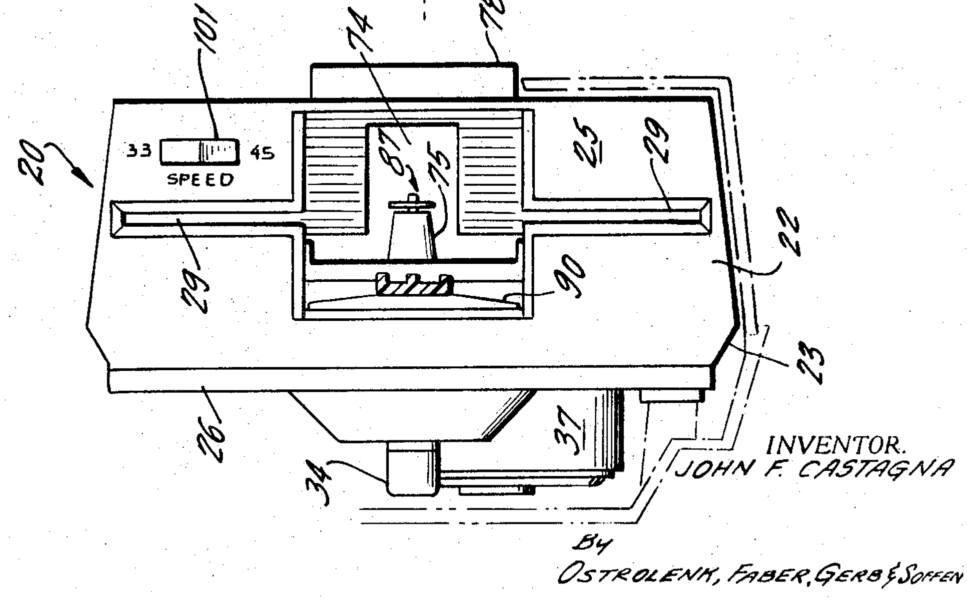
FIG. 4 is an end view of the phonograph of FIG. 3 looking in the direction of arrows 4–4 of FIG. 3.
Figure 7:
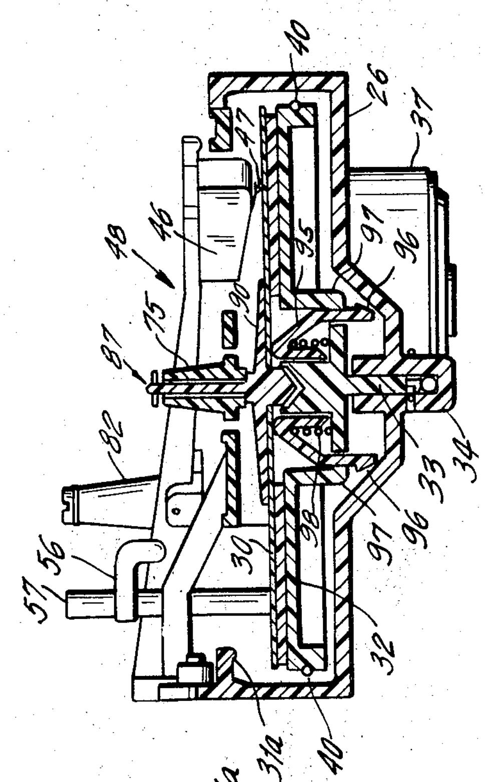
Figure 8:
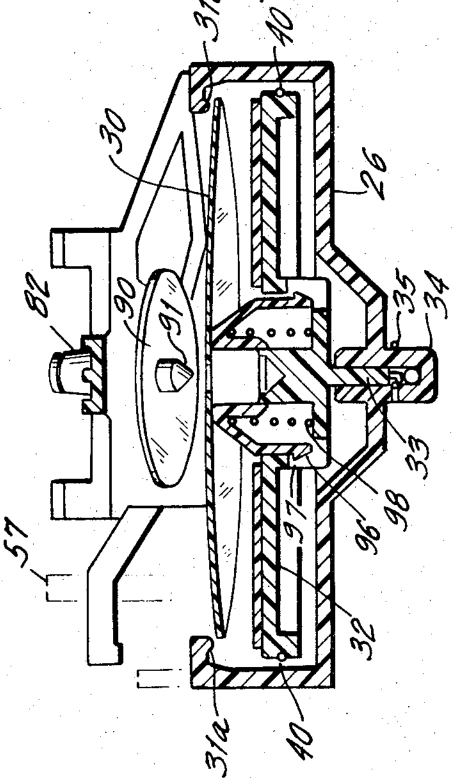

FIGS. 7 and 8 are cross sections taken through lines 7–7 and 8–8 respectively of FIG. 3, looking in the directions of the respective arrows 7–7 and 8–8.

FIG. 9 is an enlarged perspective showing the spindle as it enters a record-centering hole.

Figure 10:
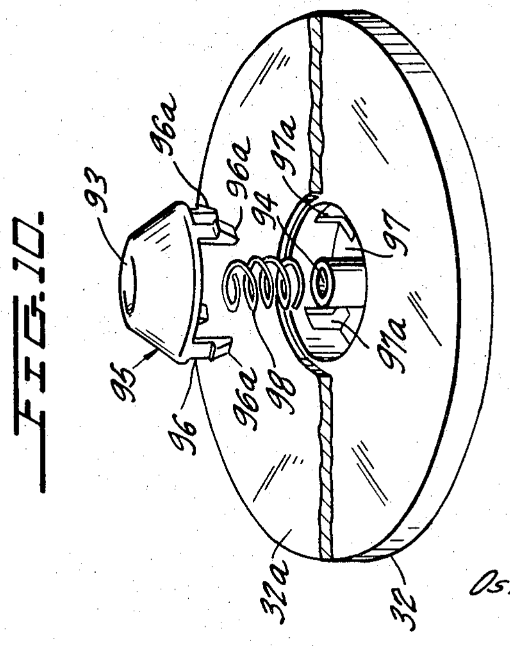

FIG. 10 is an exploded perspective of the turntable and record lifter element.

Figure 11:
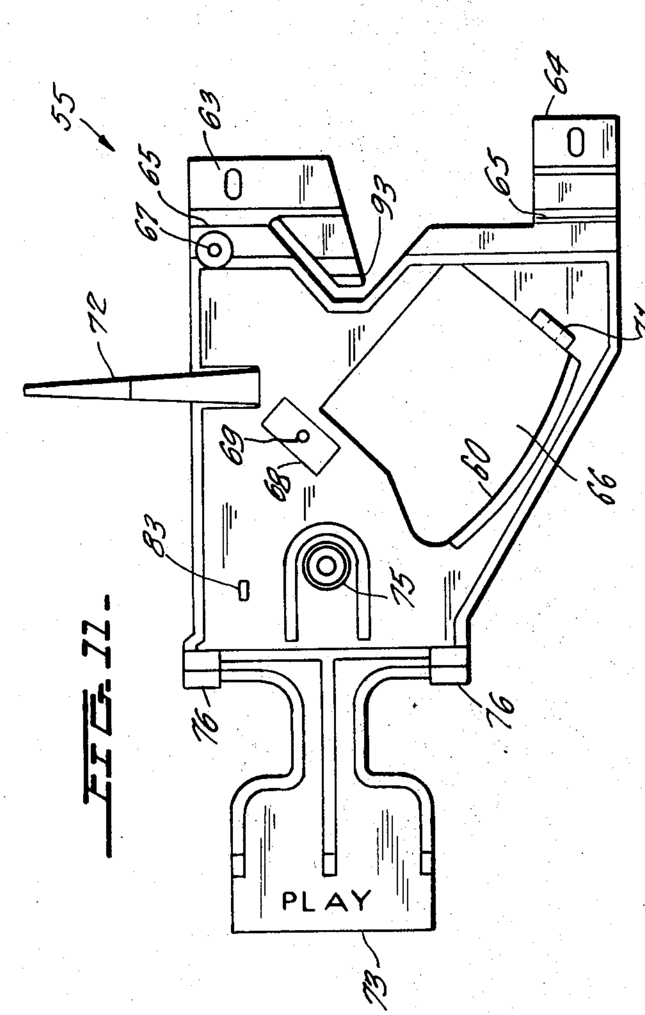
Figure 6:
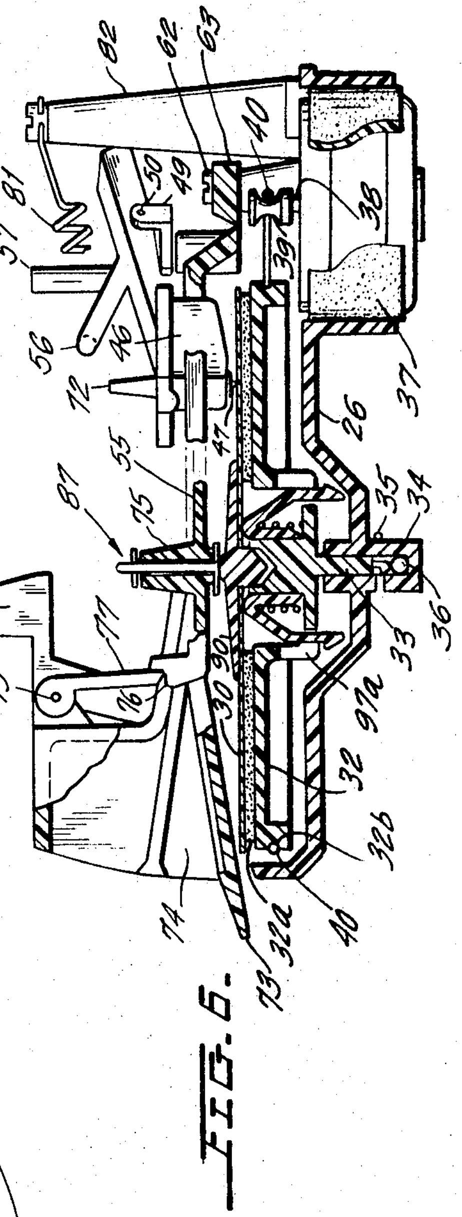

FIG. 11 is a plan view of the hinged platform.

Figure 12:
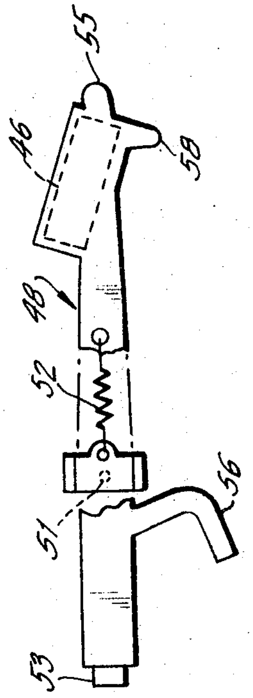

FIG. 12 is a plan view of the tone arm with portions thereof cut away to better reveal other relevant elements.

Figure 13:
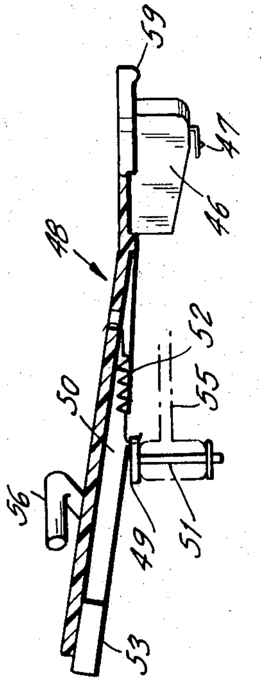

FIG. 13 is a side elevation of the tone arm looking in the direction of arrows 13–13 of FIG. 12.

Figure 14:
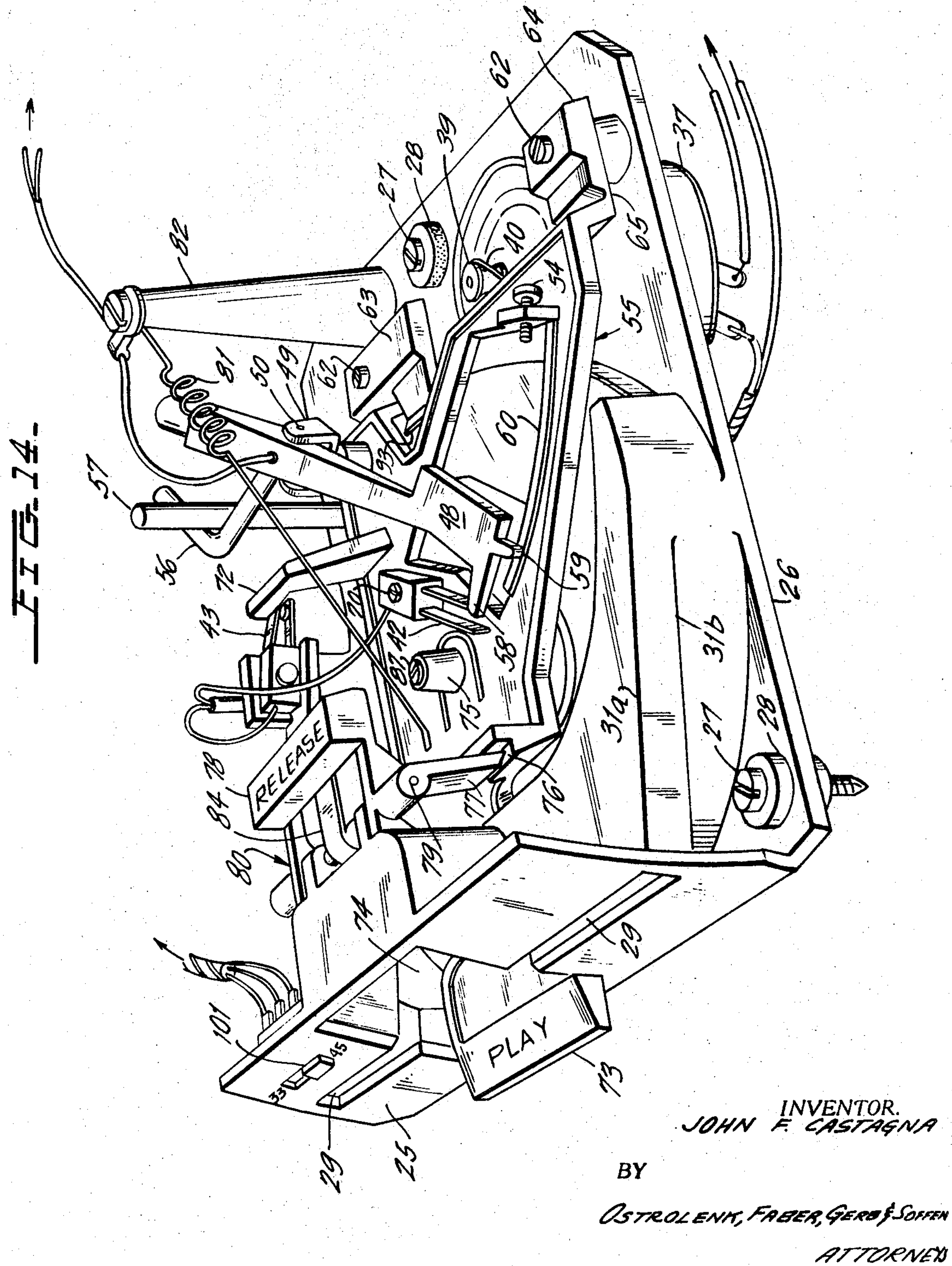

FIG. 14 is a perspective of the record playback and handling elements of the phonograph.

Now referring to the FIGS. Phonograph 20 includes housing 21 constructed of interlocking upper and lower molded plastic sections 22, 23, respectively. The front of lower section 23 is extended forwardly to provide carrying handle 24 while the front of housing 21 above handle 24 is generally closed by upturned wall 25 at the forward end of base 26. The latter is fixedly secured to lower housing section 23 by a plurality of screws 27 and shock mounts 28.

Front wall 25 is provided with slit-like opening 29, through which a 4″ diameter disc record is inserted into housing 21. Upper and lower guide sections 31*a*, 31*b* respectively, formed integrally with base 26 and positioned immediately behind slit 29, direct record 30 over turntable 32. The latter is positioned parallel to the main surface of base 26 and is rotatable on stub shaft 33 which extends downward from turntable 32 into bearing sleeve 34 of base 26, being held therein by split washer retainer 35. The lower end of shaft 33 rests against ball bearing 36 at the bottom closed end of sleeve 34. DC motor 37 is mounted below the main section of base 26, with sheave 39 on motor shaft 38 extending above the main horizontal surface of base 26. Rubber band 40, of circular cross section, extends into peripheral groove 32*b* and over sheave 39 to provide a driving connection from sheave 39 to turntable 32.

Figure 2:
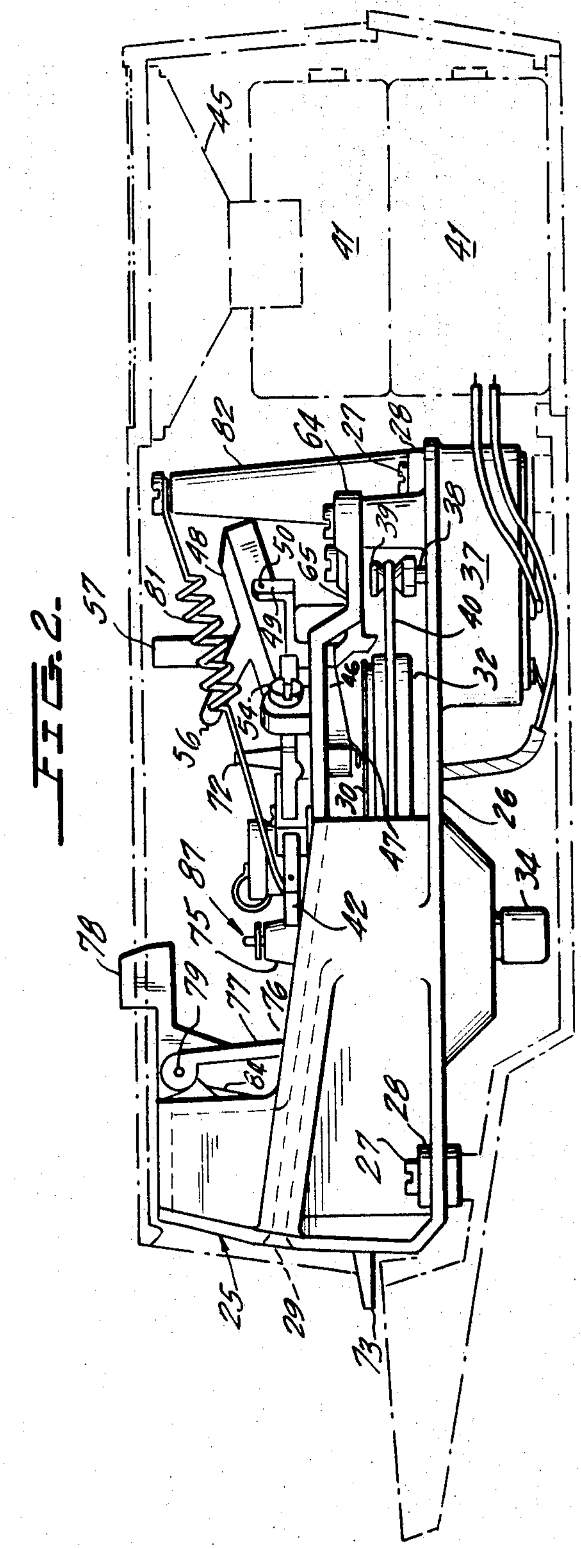
FIG. 2 is a side elevation of the phonograph of FIG. 1, looking in the direction of arrows 2–2, with certain elements being outlined in phantom so as not to obscure more significant elements.

As will be explained hereinafter in greater detail, batteries 41 (FIG. 2) connected in series circuit with normally closed switch 42 and normally opened switch 43 (FIG. 1A) energize motor 37 when both switches 42 and 43 are closed. Since motor speed changing switch 101, mounted to housing front wall 25, and speed-changing elements associated therewith are well known to the phonograph art, these elements are not included in the electrical schematic of FIG. 1A. When both switches 42, 43 are closed, batteries 41 also energize amplifier 44 which drives loudspeaker 45 located immediately behind slotted opening 46*a* at the rear portion of the upper wall of housing 21. Amplifier 44 receives signals from pickup cartridge 46 when stylus 47 thereof is driven by signals recorded in the sound grooves of record 30.

Pickup cartridge 46 is mounted to the forward end of tone arm 48 which is mounted between the arms of yoke or clevis 49 on horizontal pivot pin 50. Clevis 49 is mounted on the upper surface of hinged platform 55 for pivotal movement about pin 51 which defines a vertical axis intersecting the horizontal axis defined by pin 50. Tension spring 52 connected between tone arm 48 and the web portion of clevis 49 biases the forward end of tone arm downward toward turntable 32, and acts in opposition to counterweight 53 mounted to tone arm 48 at a point to the rear of horizontal pivot 50. As will hereinafter be seen, L-shaped extension 56 of tone arm 48 cooperates with post 57 extending upward from base 26 to automatically move the forward end of tone arm 48 against adjusting screw 54 which positions stylus 47 over the lead-in groove of record 30. Lateral projection 58 at the forward end of tone arm 48 opens the normally closed contacts of switch 42 when stylus 47 reaches the lead-out groove of record 30. Forward projection 59 of tone arm 48 is engaged by ledge 60 of platform 55 to lift stylus 47 from record 30 when platform 55 is tilted upward.

Screws 62 extending through clearance apertures in rearwardly extending mounting tabs 63, 64 of platform 55 and threaded into apertures in base 26, fixedly secure one end of platform 55 to the upper surface of base 26. Platform 55 is constructed of plastic material, such as polypropylene, with portions of reduced cross section constituting integral horizontal hinge 65 positioned along the forward edges of mounting tabs 63, 64. Platform 55 also includes cutout or window 66 within which pickup cartridge 46 moves; bearing aperture 67 through which clevis pivot pin 51 extends; rectangular depression 68 for locating switch 42 and aperture 69 for receiving screw 70 which secures switch 42 to platform 55; upward tab 71 through which adjusting screw 54 extends; L-shaped extension 72 for engaging and closing switch 43, secured to base 26, when platform 55 is in its lowered position; forward extension 73 projecting through mouth 74 at the front of housing 21 so as to be manually actuable; spindle-bearing formation 75; and two latching ledges 76 engageable by latch fingers 77 extending downwardly from releasable latch member 80 mounted to base 26 for pivotal movement about a horizontal axis defined by pin 79.

Spring 84 (FIGS. 2 and 14) mounted tp pin 79 and bearing against base 26 and latch member 80 bias latching tips 77 toward their latching positions. Operating portion 78 (FIGS. 1 and 14 ) of latch member 80 is accessible through an aperture in the top of housing 21 for manual operation. When operating part 78 is depressed, latch portions 77 pivot forward of latching ledges 76 and release platform 55, permitting the forward end thereof to pivot upward under the influence of coiled tension spring 81 connected at one end to the upper end of post 82 extending upward from base 26 and at the other end to platform 55 at notch 83 thereof. Upward movement of platform 55 is limited through engagement thereof with portions of base 26 defining mouth 74.

As best seen in FIG. 9, bearing formation 75 of hinged platform 55 is provided with bore 86 through which uniform diameter bearing portion 87*a* of spindle 87 extends, being retained in operative position by split washer 88. As will hereinafter be seen, the loose fit between spindle bearing 87*a* and bore 86 is provided for self-adjustment of spindle 87 relative to platform 55. Lubricated washer bearing 89 is mounted to spindle bearing 87*a* immediately below bore 86. The portion 87*b* of spindle 87 immediately below 89 is conical and is connected with clamping flange 90, while the lower end of spindle 87 is provided with pointed centering tip 91. The functions of clamping flange 90 and centering tip 91 will be hereinafter explained.

When hinged platform 55 is moved from its raised or record reject position of FIG. 5, centering tip 91 enters the central record hole 92 which has been operatively positioned through the engagement of record 30 with stop formation 93 formed integrally with mounting tab 63 of hinged platform 55. Conical tip 91 entering record hole 92 causes record 30 to move slightly forward until the uniform diameter portion 91*a* above pointed tip 91 is disposed in record hole 92. Tip 91 proceeds to move downward into the central depression 93' of lifter member 95 and into cooperating conical depression 94 at the upper end of the upward extension of turntable shaft 33, at which time-clamping flange 90 bears against record 30.

Lifter member 95 (FIG. 10) is provided with a frustoconical outer surface portion at the upper end thereof and a plurality of downwardly extending legs 96. Lifter member 95 is disposed in central cavity 97, with latching extensions 96*a* extending outward from legs 96 into slots 97*a* in the sidewall of cavity 97, to guide vertical movement of lifter 95 and to limit outward movement thereof. Coiled compression spring 98, centrally disposed within cavity 97, biases lifter 95 toward a raised position with the frustoconical outer surface portion thereof extending above turntable 32 to support record 30 in a reject position wherein at least a portion at the forwardly positioned peripheral edge thereof is sufficiently raised above turntable 32 to permit manual engagement of record 30 at mouth 74 when hinged platform 55 is in its raised position of FIG. 5.

Operation of phonograph 20 is commenced by inserting record 30 manually into guide slot 29 until the rear edge portion of record 30 engages stop 93. During this movement record 30 is directed along a slightly downward slope by guide formations 31*a*, 31*b*. As the advancing rear edge portion of record 30 approaches the center of turntable 32, lifter 95 is forced slightly downward by record 30, and record 30 assumes the slightly bowed condition illustrated in FIG. 8. Platform extension 73 is then depressed lowering platform 55, thereby moving centering conical spindle tip 91 into record hole 92, causing a slight forward movement of record 30, moving the innermost edge portion thereof away from stop 93. Clamping flange 90 pushes record 30 downward away from upper record guide 31*a* until spindle point 91 enters and centers itself in cooperating spindle aligner hole 94 at the center of turntable 32. At this point spindle flange 90 holds record 30 so that the latter is evenly clamped against mat 32*a* on turntable 32 in a playing position.

Since spindle bearing 75 is on a slightly flexible tab of hinged platform 55 and bore 86 is oversized with respect to the bearing portion 87*a* of spindle 87, the latter automatically adjusts itself to slight horizontal eccentricity and warpage of turntable 32 and other elements of the phonograph 20. The pressure exerted by lifter spring 98 is such that the vertical pressure on turntable bearing 36 is not excessive and record 30 is firmly clamped against the turntable mat 32*a*.

By the time spindle tip portion 91*a* enters record hole 92, pickup stylus 46 engages the lead-in groove portion of record 30, and because of the tension of tone-arm spring 52, stylus 47 remains in engagement with record 30 until completion of play. During the few degrees at the end of downward movement of platform 55, ledge 60 thereof moves below tone arm extension 59 so that the forward end of tone arm 48 is free of hinged platform 55. During this final few degrees of downward movement of platform 55, switch finger 72 thereof closes switch 43, thereby energizing turntable motor 37 and amplifier 44.

Tone arm 48 and the elements assembled thereon constitute a dynamically balanced unit, having a center of gravity falling at the intersection of the horizontal and vertical axes 50, 51, for the tone arm 48. Thus, shaking and vibration of the mechanism will not cause acceleration of movement of tone arm 48 and stylus 47 will not jump out of the record groove. Tension provided by tone arm spring 52 maintains stylus 47 in the record groove and insures proper tracking regardless of the positioning or shaking of phonograph 20 by the user. Only the spiral groove shape causes movement of stylus 47 from the peripheral region of record 30 toward the center thereof. While clamping flange 90 is larger in diameter than turntable cavity 97, flange 90 is small enough so as not to interfere with movement of stylus 47 to the end of the record lead-out groove. When stylus 47 reaches the lead-out groove of record 30, tone arm extension 58 engages switch 42 to open the contacts thereof and automatically interrupt the energizing circuits for turntable motor 37 and amplifier 44. At this time turntable 32 is stationary, record 30 remains clamped on turntable 32, stylus 47 is in the record lead-out groove, and return finger 56 of tone arm 48 is in the phantom position of FIG. 3, almost engaging return post 57.

Record 30 is released for removal thereof by depressing operating part 78 until latch fingers 77 release latching detents 76 of platform 55 permitting return spring 81 to pivot platform 55 to its raised position of FIG. 5. This unclamps record 30 and allows record lifter 95 to push record 30 up against the upper guides 31*a* to the reject position shown in FIG. 8. Lifter spring 98 exerts sufficient upward force so that record 30 is held by friction against upper guide 31*a* to prevent the lightweight record 30 from slipping out of phonograph 20 even if the latter is shaken or positioned with mouth 74 thereof facing downward, yet this force is light enough to permit record 30 to be moved past the top of lifter 95 without damaging the fine record grooves.

As platform 55 rises, return post 57 is engaged by return finger 56, thereby pivoting tone arm 48 counterclockwise about vertical pivot 51, as a center, until tone arm 48 reaches the solid line position of FIG. 3, resting against the free end of adjusting screw 54 with stylus 47 positioned to enter the lead-in groove of the next record to be placed on turntable 32.

Figure 1:
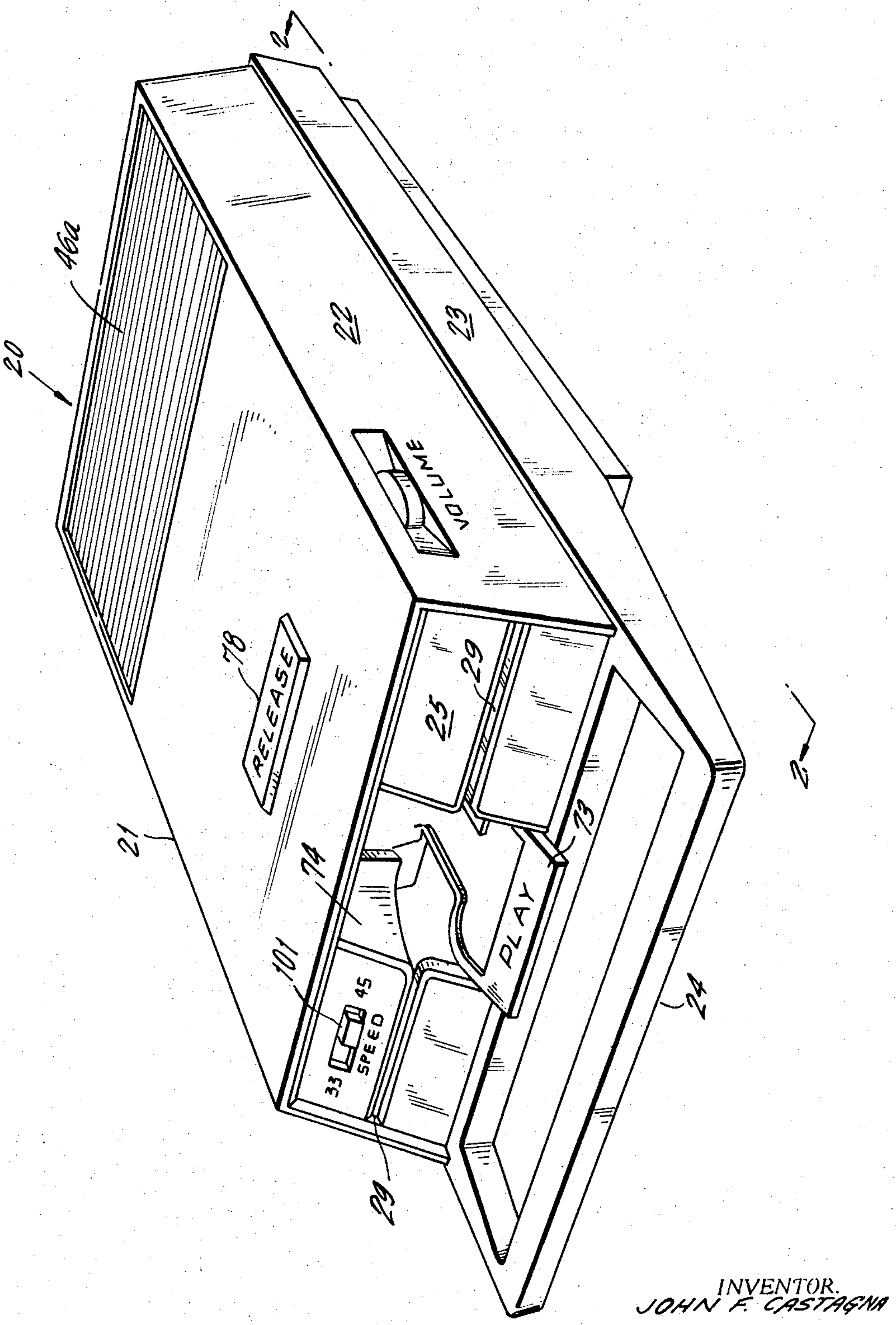
FIG. 1 is a perspective of a phonograph constructed in accordance with teachings of the instant invention.
Figure 1A:
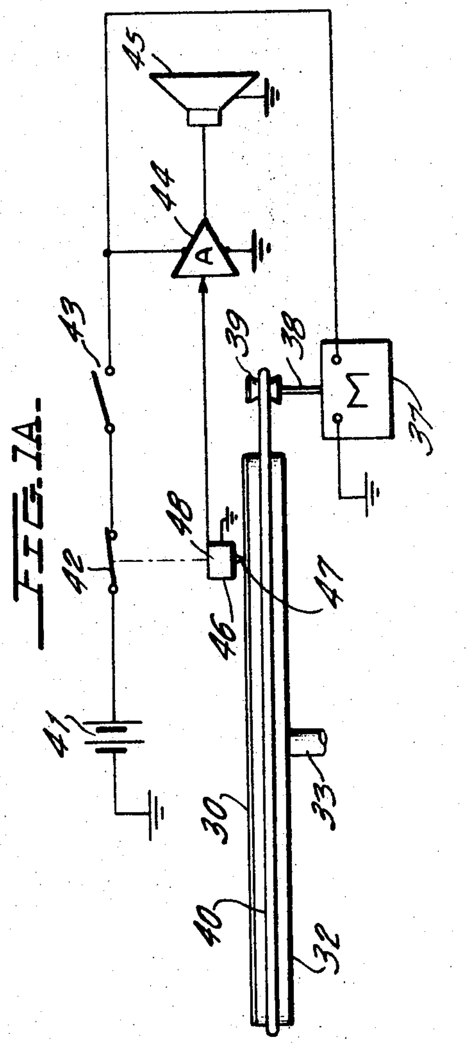
FIG. 1A is an electrical schematic for the control circuits 20 of the phonograph of FIG. 1.

Record 30 may be replayed by immediately depressing platform extension 73 or record 30 may be removed and replaced by another record, which may be played and subsequently removed by following the steps recited in connection with playing and removal of record 30. While the foregoing description of phonograph 20 makes reference to vertical and horizontal axes as well as up and down movements, it should now be apparent to those skilled in the art that such references are only applicable when phonograph 20 is oriented as illustrated in FIG. 1. However, since the record to be played is held in the phonograph 20 in reject position by friction, and while such record is being played it is positively clamped on turntable 32, and the tone arm assembly is a counterbalance unit biased to its reproduce or playing position by spring 52, phonograph 20 may be played when in any position. In addition, while phonograph 20 has been illustrated as being a self-contained unit, it may be used in conjunction with a more elaborate amplifier, as well as with such an amplifier having means for playing larger diameter relatively rigid record.

Although there has been described a preferred embodiment of this novel invention, many variations and modifications will now be apparent to those skilled in the art. Therefore, this invention is to be limited, not by the specific disclosure herein, but only by the appending claims.

I claim:

1. In apparatus for playback from a think disc-recording member, a turntable, means mounting said turntable for rotation about a central axis, a pickup unit, means mounting said pickup unit in operative position to produce output signals derived from input signals transduced by said pickup unit from a record disposed in a playing position supported on an upper surface of said turntable, and reject means operable after playback for engaging a record at the central region thereof to move such record relative to said turntable from said playing position to a reject position wherein an edge portion of such record is spaced from said turntable by being raised thereabove to facilitate manual removal of such record from said apparatus, said reject means including a lifting element, biasing means urging said lifting element to a raised position above an upper surface, a central opening in said turntable into which said element may be operated downward against force exerted by said biasing means to a lowered position which is no higher than said surface, and operating means for moving said element to said lowered position to permit a record to assume its playing position on said surface.

The embodiments of the invention in which an exclusive privilege or property is claimed are defined as follows.

2. Apparatus as set forth in claim 1 in which the operating means is engageable with a record from above at the center thereof to drive such record from said reject position to said playing position.

3. Apparatus as set forth in claim 2 in which there is a record-centering means connected to said operating means, said record-centering means including a spindle having a tapered tip projecting below said operating means and extending into a cooperating centering recess in said lifting element when said element is in said lowered position.

4. Apparatus as set forth in claim 3 in which said spindle is mounted in a loosely fitted bearing aperture which permits tilting of said spindle to facilitate entry of said tapered tip into said centering recess.

5. Apparatus as set forth in claim 4 in which there is a housing in which said turntable and said pickup unit are disposed, an opening in said housing through which a record is inserted and guided to said reject position, said central axis being fixed relative to said housing, said turntable being fixed along said axis.

6. Apparatus as set forth in claim 5 also including a platform disposed within said housing above said turntable, said platform mounting said operating means and said centering means for movement as a unit, means mounting said platform for movement between a first position wherein said spindle is external of said centering recess and a second position below said first position wherein said element is in its said lowered position, an electric motor for driving said turntable, an energizing circuit for said motor, normally open switch means in said circuit operable by said platform to closed position to normally energize said motor when the platform is in said second position.

7. Apparatus as set forth in claim 6 in which said pickup is mounted for movement from a position at the periphery of a record on said turntable toward a position near the center of such record, means for automatically moving said pickup to the periphery of a record on said turntable responsive to operation of said platform from said second to said first position.

8. Apparatus as set forth in claim 7 in which the means mounting said pickup unit comprises a tone arm having said pickup unit at one end thereof and a pivot mounting near the other end connected to said platform, normally closed switch means in said energizing circuit operable by said tone arm to open position to deenergize said motor when said tone arm is pivoted to a predetermined position wherein said pickup is at the central region of a record on said turntable.

9. Apparatus as set forth in claim 7 in which there is a means biasing said platform toward said first position, and releasable latch means for maintaining said platform in said second position.

10. Apparatus as set forth in claim 7 in which there is a hinge means pivotally mounting said platform along an edge thereof, said platform constructed of molded plastic material and having said hinge means integrally formed therewith.

11. Apparatus as set forth in claim 7 in which there is a record stop in the region of said hinge means to roughly position a record inserted into said housing through said opening.

12. Apparatus as set forth in claim 7 in which said platform includes an operating extension projecting through said opening for manual operation, said opening having a slit section, said extension moving across said slit section as said platform moves between said first and second positions.

13. Apparatus as set forth in claim 1 in which said biasing means acting through said lifting element exerts a force generally normal to a record in its said reject position to maintain such record in frictional holding engagement with a surface portion of said apparatus during changes in orientation of said apparatus.